United States Patent [19]
Fortenbery et al.

[11] Patent Number: 5,372,234
[45] Date of Patent: Dec. 13, 1994

[54] TIPPING APPARATUS FOR A SORTATION CONVEYOR

[75] Inventors: J. David Fortenbery, Charlotte; David Erceg, Concord, both of N.C.

[73] Assignee: Mantissa Corporation, Charlotte, N.C.

[21] Appl. No.: 160,934

[22] Filed: Dec. 2, 1993

[51] Int. Cl.⁵ .............................................. B65G 47/40
[52] U.S. Cl. .................................................. 198/365
[58] Field of Search ................. 198/365, 366, 370, 372

[56] References Cited

U.S. PATENT DOCUMENTS

| | | | |
|---|---|---|---|
| 3,034,665 | 5/1962 | Speaker | 198/365 X |
| 3,510,014 | 5/1970 | Speaker et al. | 198/365 X |
| 3,945,485 | 3/1976 | Speaker | 198/370 |
| 4,102,448 | 7/1978 | Wolbrink et al. | 198/365 |
| 4,174,773 | 11/1979 | Venzke | 198/365 |
| 4,635,785 | 1/1987 | Prydtz | 198/365 |
| 4,856,642 | 8/1989 | Nicholson et al. | 198/365 |
| 4,982,828 | 1/1991 | Nicolson et al. | 198/365 |
| 4,984,674 | 1/1991 | Fortenberry | 198/365 |

FOREIGN PATENT DOCUMENTS 0678002  8/1979  U.S.S.R. .............. 198/365

*Primary Examiner*—James R. Bidwell
*Attorney, Agent, or Firm*—Rhodes Coats & Bennett

[57] ABSTRACT

A tipping apparatus for a sortation conveyor of the type having a plurality of tiltable tray assemblies and an extended track along which such assemblies are conveyed. The tipping apparatus includes a mounting panel having a flipper arm attached at one end to the mounting panel. An actuator is attached to the mounting panel and a crank arm is attached between the flipper arm and the actuator. The flipper arm is movable between a first "cocked" position and a second "fired" position in engagement with the tray assembly for tilting the tray assemblies. In the preferred embodiment, the apparatus includes a support for mounting the mounting panel to the track.

10 Claims, 3 Drawing Sheets

TIPPING APPARATUS FOR A SORTATION CONVEYOR

BACKGROUND OF THE INVENTION (1) Field of the Invention

The present invention relates generally to tilt tray conveyors of the type used to sort packages or parcels and, more particularly, to an apparatus for tipping the trays of such a conveyor system.

(2) Description of the Prior Art

Tilt trays conveyor systems are shown, for example, in U.S. Pat. Nos. 3,945,485 and 4,102,448, issued to Speaker, and U.S. Pat. No. 4,635,785, issued to Prydtz. The general arrangement of such systems include a track and a conveying chain on which are mounted a plurality of carriages spaced along the chain. Each carriage has a tray which is mounted for normal positioning and for tipping for one, the other or both sides of the direction of movement of the chain. Parcels or the like to be sorted are carried on the trays and transported by the conveyor to a location where sorting is to occur. At the sorting location the trays are tipped to one side or the other to discharge the transported article from the conveyor. Typically, control over the tipping is exercised by some sortation controlling means such as a computer which sequentially controls the tipping device. Prior tipping devices have been pneumatically actuated cylinder devices in which some striker element is moved upwardly into the path of an advancing carrier to engage an actuating cam on the carrier and cause tipping.

U.S. Pat. Nos. 4,982,828 and 4,856,642, issued to Nicholson, are drawn to an improved lever arm for a tilt tray sortation conveyor having a formula defined unlatching and tipping cam section. FIG. 2 in both of these patents shows a conventional tipping apparatus which includes a tipping arm and wheel mounted to a bracket attached adjacent to the conveyor track and a pneumatic actuator. However, as can be seen, a substantial amount of the force impact onto the tip-up wheel is transmitted to the pneumatic cylinder.

U.S. Pat. No. 4,174,773, issued to Venzke, discloses a tip-up and mounting apparatus in a sortation conveyor which includes a support angle, upstanding mounting angles, mounting brackets, and a tray engaging roller mounted on crank arms pivoted to the mounting brackets. The mounting angles are disposed of their apices facing outwardly of the conveyor, thus providing a mounting surface at 45 degrees to the conveyors machine direction for the mounting bracket. The crank arms are pivoted to the mounting bracket which provides an in and out component of motion to the rollers during the movement to and away from the sortation tray engagement, thereby maintaining a short roller dwell time and the tray interfering position. However, such an arrangement has a large mass located on the crank arm and roller which requires a correspondingly large pneumatic actuator. In addition, significant amounts of force may be transmitted from the crank arm through the actuator, resulting in a shortened life of the actuator assembly.

Thus, their remains a need for a new and improved tipping apparatus which is operable to reliably engage and tip the appropriate carriage on the track, while, at the same time is inherently stable and requires a much smaller pneumatic actuator for operation.

SUMMARY OF THE INVENTION

The present invention is directed to a tipping apparatus for a sortation conveyor of the type having a plurality of tiltable tray assemblies and an extended track along which such assemblies are conveyed which includes a mounting panel having a flipper arm attached at one end to the mounting panel. An actuator means is attached to the mounting panel and a crank arm is attached between the flipper arm and the actuator means. The flipper arm is movable between a first "cocked" position and a second "fired" position in engagement with the tray assembly for tilting the tray assemblies.

In the preferred embodiment, the apparatus includes support means for mounting the mounting panel to the track. The support means includes a pair of opposed mounting brackets, each bracket having an upper end for engaging the outer side of the track and a lower end extending below the track. A compression bar located between the lower ends of each of the pair of opposed mounting brackets. A tension bar located between the compression bar and the upper ends of each of the pair of opposed mounting brackets forms a third class lever, thereby securing the upper ends of each of the pair of opposed mounting brackets to the track.

Accordingly, one aspect of the present invention is to provide in a sortation conveyor of the type having a plurality of tiltable tray assemblies and an extended track along which such assemblies are conveyed, an improved tipping apparatus for engaging and tilting the tray assemblies at preselected locations along the track. The apparatus includes a flipper arm having one end pivotally attached adjacent to the track and the other end movable between a first "cocked" position and a second "fired" position in engagement with the tray assemblies for tilting the tray assemblies.

Another aspect of the present invention is to provide a tipping apparatus for a sortation conveyor having at least one tiltable tray assembly. The apparatus includes: (a) a mounting panel; (b) a flipper arm attached at one end to the mounting panel; (c) an actuator means attached to the mounting panel; and (d) a crank arm attached between the flipper arm and the actuator means, whereby the flipper arm is movable between a first "cocked" position and a second "fired" position in engagement with the tray assembly for tilting the tray assembly.

Still another aspect of the present invention is to provide in a sortation conveyor of the type having a plurality of tiltable tray assemblies and an extended track along which such assemblies are conveyed, an improved tipping apparatus for engaging and tilting the tray assemblies at preselected locations along the track. The apparatus includes: (a) a mounting panel; (b) a flipper arm attached at one end to the mounting panel; (c) an actuator means attached to the mounting panel; (d) a crank arm attached between the flipper arm and the actuator means, whereby the flipper arm is movable between a first "cocked" position and a second "fired" position in engagement with the tray assembly for tilting the tray assembly; and (e) support means for mounting the mounting panel to the track. The support means includes: (i) a pair of opposed mounting brackets, each bracket having an upper end for engaging the outer side of the track and a lower end extending below the track; (ii) a compression bar located between the lower ends of each of the pair of opposed mounting brackets; and (iii) a tension bar located between the compression bar and the upper ends of each of the pair of opposed mounting brackets for forming a third class lever, whereby the upper ends of each of the pair of opposed mounting brackets are secured to the track.

These and other aspects of the present invention will become apparent to those skilled in the art after a reading of the following description of the preferred embodiment when considered with the drawings.

DESCRIPTION OF THE PREFERRED EMBODIMENTS

Figure 1:
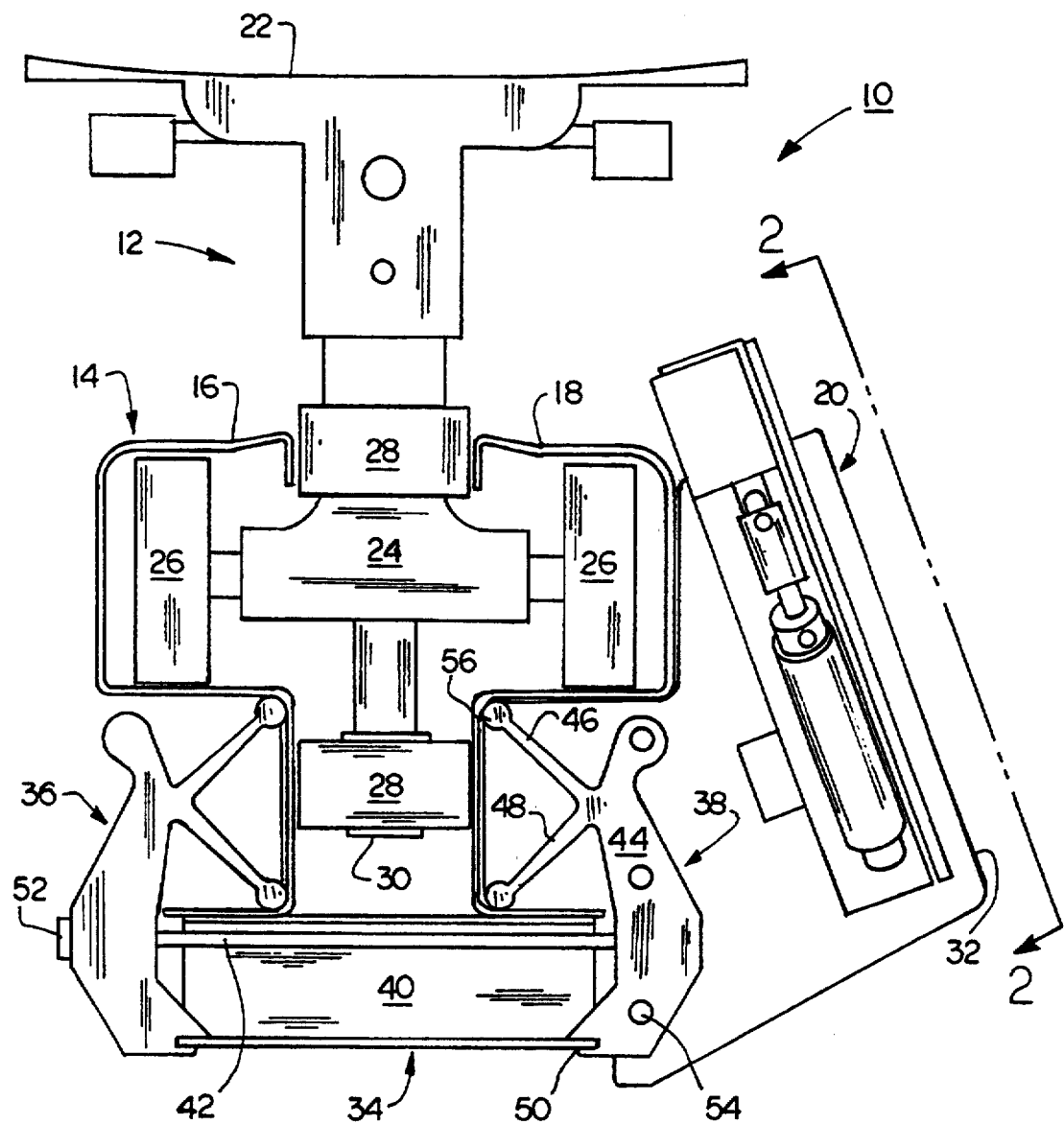
FIG. 1 is a rear elevational view illustrating a tipping apparatus constructed according to the present invention.

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Referring now to the drawings in general and FIG. 1 in particular, it will be understood that the illustrations are for the purpose of describing a preferred embodiment of the invention and are not intended to limit the invention thereto. As best seen in FIG. 1, a tipping apparatus, generally designated 10, is shown constructed according to the present invention. The apparatus includes a plurality of carriage assemblies 12 which follow a track 14 having a pair of opposed rails 16, 18. A tipping assembly 20 is attached to at least one side of track 14 and is operable to tilt carriage assembly 12 in the opposite direction in response to a control signal.

Carriage assembly 12 includes a pivotly mounted tray 22 mounted to carriage 24. A plurality of wheels 26 support the carriage 24 in the Y-direction and a plurality of wheels 28 support the carriage 24 in the X-direction. A chain drive 30 is connected to the lower portion of carriage 24 adjacent to the lower wheel 28 for providing locomotion to the carriage.

Tipping assembly 20 is attached to track 14 by means of a mounting panel 32 and a support means 34. Support means 34 includes a pair of opposed "moosehead" brackets 36,38, These brackets are more fully described in U.S. patent application Ser. No. 29/004,831 which is hereby incorporated by reference in its entirety. A compression bar 40 is located between the lower edges of brackets 36,38 for providing an outward force on the lower edges of the brackets. A tension bar 42 is attached to the mid portion of the brackets 36,38 for providing an inward force on the brackets. This arrangement forms a third class lever and is operable to secure the support means 34 to the lower rails of track 14 without the need to weld or drill or otherwise intrude into the surface of the track.

Each "moosehead" bracket 36,38 includes an elongated bar 44 having a pair of diverging arms 46,48 on one end for engaging the lower rails of track 14 and a notch 50 on the other end for engaging compression bar 40. Each bracket includes at least one aperture 52 for receiving tension bar 42. A plurality of apertures 54 are located perpendicular to aperture 52 for securing the support means 34 to mounting panel 32, thereby attaching tipping assembly 20. In the preferred embodiment the outward ends of arms 46,48 are rounded with a circular cross-section 56 to better distribute the force onto lower rails of track 14.

Figure 2:
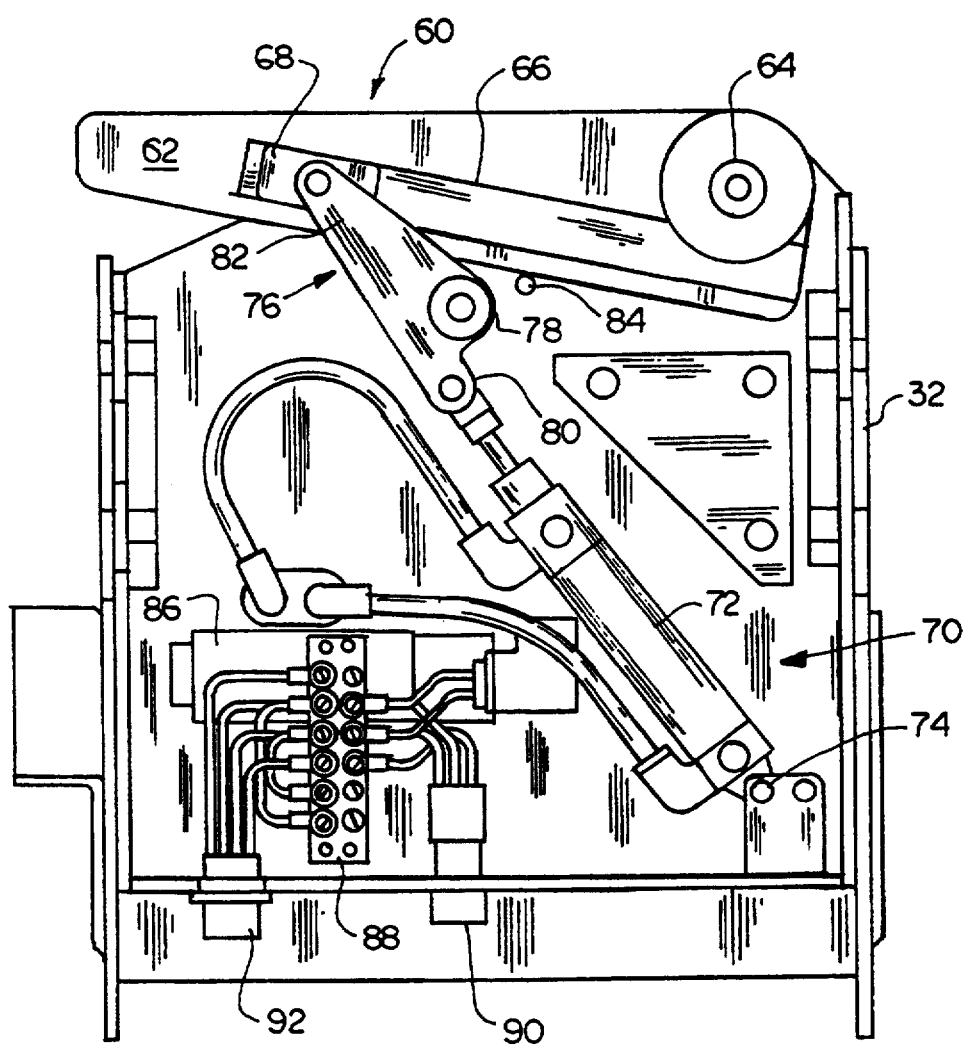
FIG. 2 is a cross-sectional view of FIG. 1, taken along lines 2—2, illustrating the tipping apparatus in its "cocked" position.

The tipping assembly 20 may best be seen in FIG. 2. Tipping assembly 20 includes a flipper assembly 60, an actuator assembly 70 and a crank arm assembly 76. Flipper assembly 60 includes a flipper arm 62 constructed of UHMW polyethylene plastic. Flipper arm 62 is connected to mounting panel 32 at first pivot point 64. A channel 66 extends longitudinally along flipper arm 62 for receiving a slide 68. Actuator assembly 70 includes a pneumatic cylinder 72 connected at one end to second pivot point 74. Crank arm assembly 76 is connected to mounting panel 32 at third pivot point 78. First crank arm 80 is connected to the rod of pneumatic cylinder 72. Second crank arm 82 is connected to slide 68.

In the preferred embodiment the stroke of pneumatic cylinder 72 is sufficiently long so as to rotate crank arm assembly 76 from a first longitudinally extending position to a second "over center" position in which the connection point between slide 68 and second crank arm 82 passes over the center of third pivot point 78 as shown by dimension "A". This position ensures that substantially all of the force transmitted to flipper arm 62 by carriage assembly 12 is received by first pivot point 64 and third pivot point 78 with little or no load being transmitted to the actuator assembly 70. This allows a much smaller pneumatic cylinder to be utilized resulting in significant cost savings.

In the preferred embodiment, a stop 84 located between the "fired" position of crank arm assembly 76 and the "cocked" position of flipper arm 62 results in the positive location of the flipper arm in both its "cocked" and "fired" positions.

Also, in the preferred embodiment, a solenoid assembly 86 is located on mounting panel 32 adjacent to actuating assembly 70. Solenoid assembly 86 provides control of the air supply to pneumatic cylinder 72. A terminal strip 88 adjacent to the solenoid assembly 86 includes connections for a push button 90 utilized for test purposes. In addition, a four pin connector 92 is also connected to terminal strip 88 providing input from a remote control tipping actuator control system (not shown).

In operation, solenoid assembly 86 located on mounting panel 32 adjacent to actuating assembly 70 receives a control signal to tip an approaching carriage. Solenoid assembly 86 directs the air supply to pneumatic cylinder 72. Pneumatic cylinder 72 extends causing crank arm 76 connected to mounting panel 32 at third pivot point 78 to rotate, thereby moving slide 68 in channel 66 which extends longitudinally along flipper arm 62. Flipper arm 62, in turn, rotates upward to engage and tip the approaching carriage.

Figure 3:
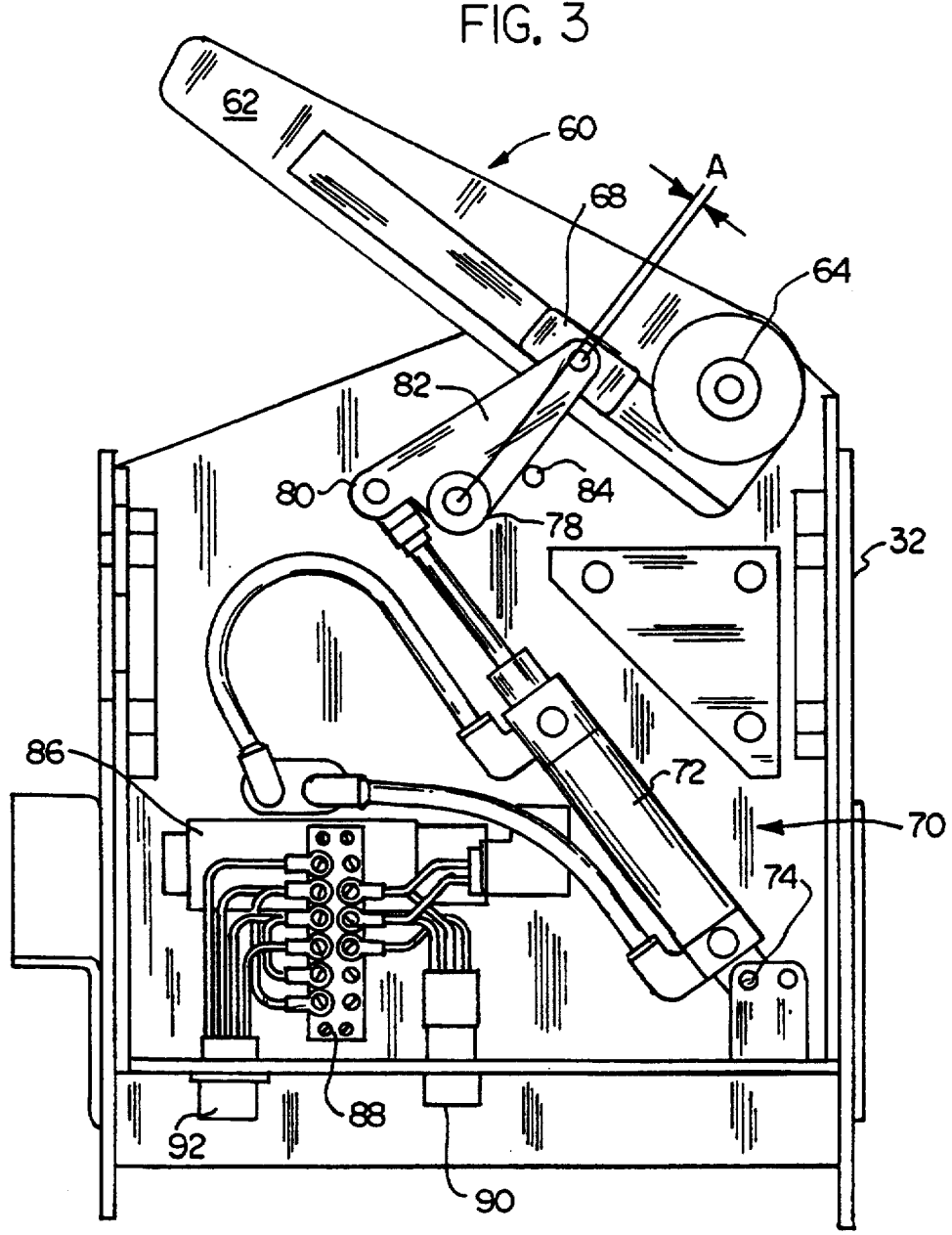
FIG. 3 is a view similar to FIG. 2, illustrating the tipping apparatus in its "fired" position.

The stroke of pneumatic cylinder 72 is sufficiently long so as to rotate crank arm assembly 76 from a first longitudinally extending position to a second "over center" position in which the connection point between slide 68 and second crank arm 82 passes over the center of third pivot point 78 as shown in FIG. 3. Accordingly, substantially all of the force transmitted to flipper arm 62 by carriage assembly 12 is received by first pivot point 64 and third pivot point 78 with little or no load being transmitted to the actuator assembly 70.

Certain modifications and improvements will occur to those skilled in the art upon a reading of the foregoing description. By way of example, a hydraulic or electro-mechanical actuator could be substituted for the pneumatic actuator. It should be understood that all such modifications and improvements have been deleted herein for the sake of conciseness and readability but are properly within the scope of the following claims.

We claim:

1. In a sortation conveyor of the type having a plurality of tiltable tray assemblies and an extended track along which such assemblies are conveyed, an improved tipping apparatus for engaging and tilting said tray assemblies at preselected locations along said track, said apparatus comprising: a flipper arm having one end pivotally attached adjacent to said track and the other end movable between a first "cocked" position and a second "fired" position in engagement with said tray assemblies for tilting said tray assemblies and a support means for mounting said flipper arm to said track, wherein said support means includes: (i) a pair of opposed mounting brackets, each bracket having an upper end for engaging the outer side of said track and a lower end extending below said track; (ii) a compression bar located between said lower ends of each of said pair of opposed mounting brackets; and (iii) a tension bar located between said compression bar and said upper ends of each of said pair of opposed mounting brackets for forming a third class lever, whereby said upper ends of each of said pair of opposed mounting brackets are secured to said track.

2. The apparatus according to claim 1, wherein each of said pair of opposed mounting brackets includes an elongated bar having a pair of diverging legs attached to said upper end for engaging said track and a notch in said lower end for engaging said compression bar.

3. The apparatus according to claim 2, wherein said elongated bar includes a plurality of apertures for attaching said flipper arm.

4. A tipping apparatus for a sortation conveyor having at least one tiltable tray assembly, said apparatus comprising:

(a) a mounting panel;
(b) a flipper arm attached at one end to said mounting panel;
(c) an actuator means attached to said mounting panel; and
(d) a crank arm attached between said flipper arm and said actuator means, whereby said flipper arm is movable between a first "cocked" position and a second "fired" position in engagement with said tray assembly for tilting said tray assembly, wherein said flipper arm includes a longitudinally extending channel along its length and a slide movably located in said channel and attached to said crank arm.

5. The apparatus according to claim 4, wherein said actuator means is a pneumatic cylinder having one end attached to said mounting panel and the other end attached to said crank arm.

6. In a sortation conveyor of the type having a plurality of tiltable tray assemblies and an extended track along which such assemblies are conveyed, an improved tipping apparatus for engaging and tilting said tray assemblies at preselected locations along said track, said apparatus comprising:

(a) a mounting panel;
(b) a flipper arm attached at one end to said mounting panel;
(c) an actuator means attached to said mounting panel;
(d) a crank arm attached between said flipper arm and said actuator means, whereby said flipper arm is movable between a first "cocked" position and a second "fired" position in engagement with said tray assembly for tilting said tray assembly; and
(e) support means for mounting said mounting panel to said track, wherein said support means includes:
  (i) a pair of opposed mounting brackets, each bracket having an upper end for engaging the outer side of said track and a lower end extending below said track;
  (ii) a compression bar located between said lower ends of each of said pair of opposed mounting brackets; and
  (iii) a tension bar located between said compression bar and said upper ends of each of said pair of opposed mounting brackets for forming a third class lever, whereby said upper ends of each of said pair of opposed mounting brackets are secured to said track.

7. The apparatus according to claim 6, wherein each of said pair of opposed mounting brackets includes an elongated bar having a pair of diverging legs attached to said upper end for engaging said track and a notch in said lower end for engaging said compression bar.

8. The apparatus according to claim 7, wherein said elongated bar includes a plurality of apertures for attaching said flipper arm.

9. The apparatus according to claim 6, wherein said flipper arm includes a longitudinally extending channel along its length and a slide movably located in said channel and attached to said crank arm.

10. The apparatus according to claim 6, wherein said actuator means is a pneumatic cylinder having one end attached to said mounting panel and the other end attached to said crank arm.

* * * * *